Dec. 1, 1953   H. C. SEGO   2,661,104
GRAIN BED FOR VEHICLES
Filed May 17, 1948   3 Sheets-Sheet 2

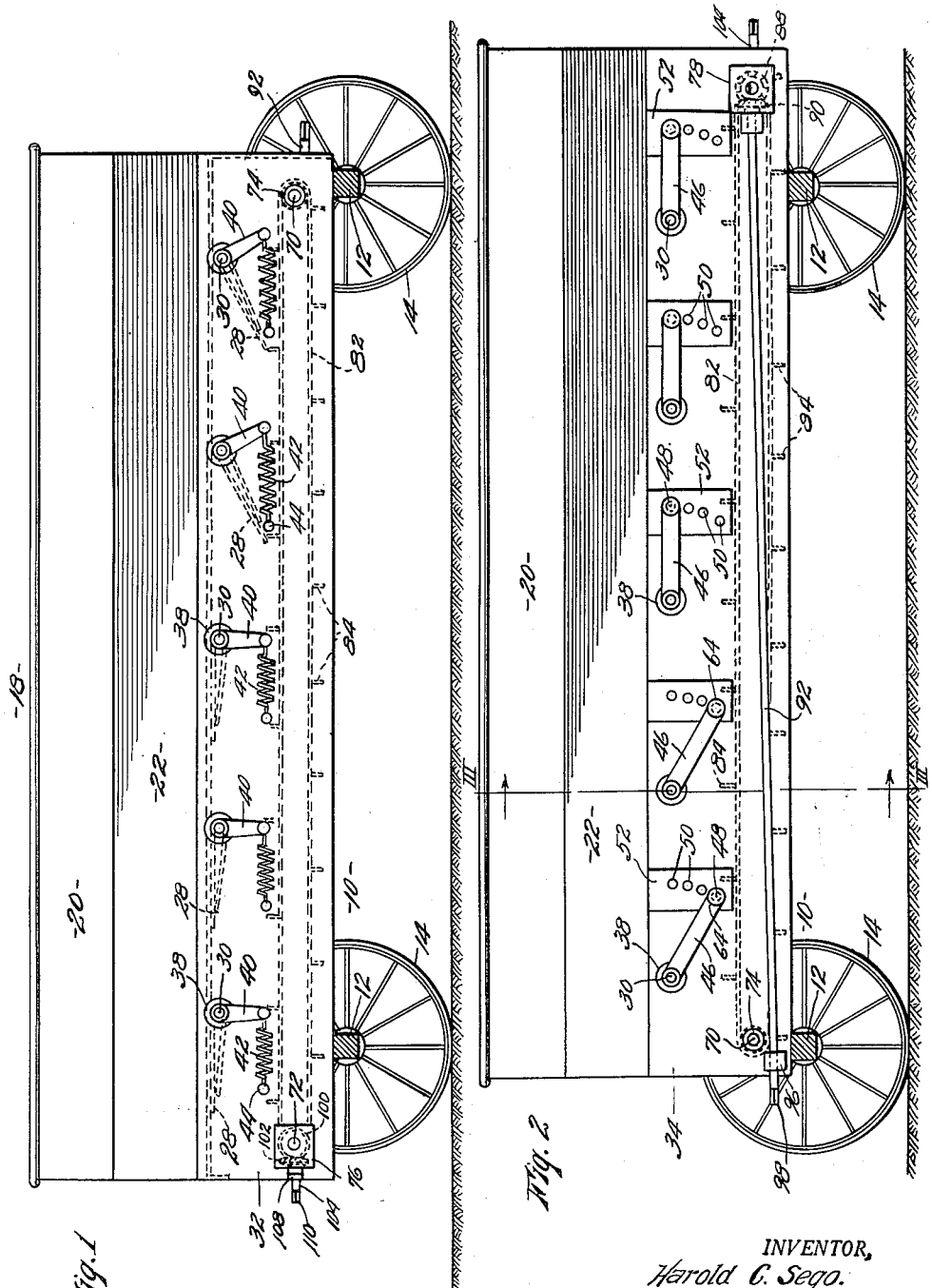

INVENTOR,
Harold C. Sego.
BY
Roy E. Hamilton,
Attorney.

Dec. 1, 1953   H. C. SEGO   2,661,104
GRAIN BED FOR VEHICLES
Filed May 17, 1948   3 Sheets-Sheet 3
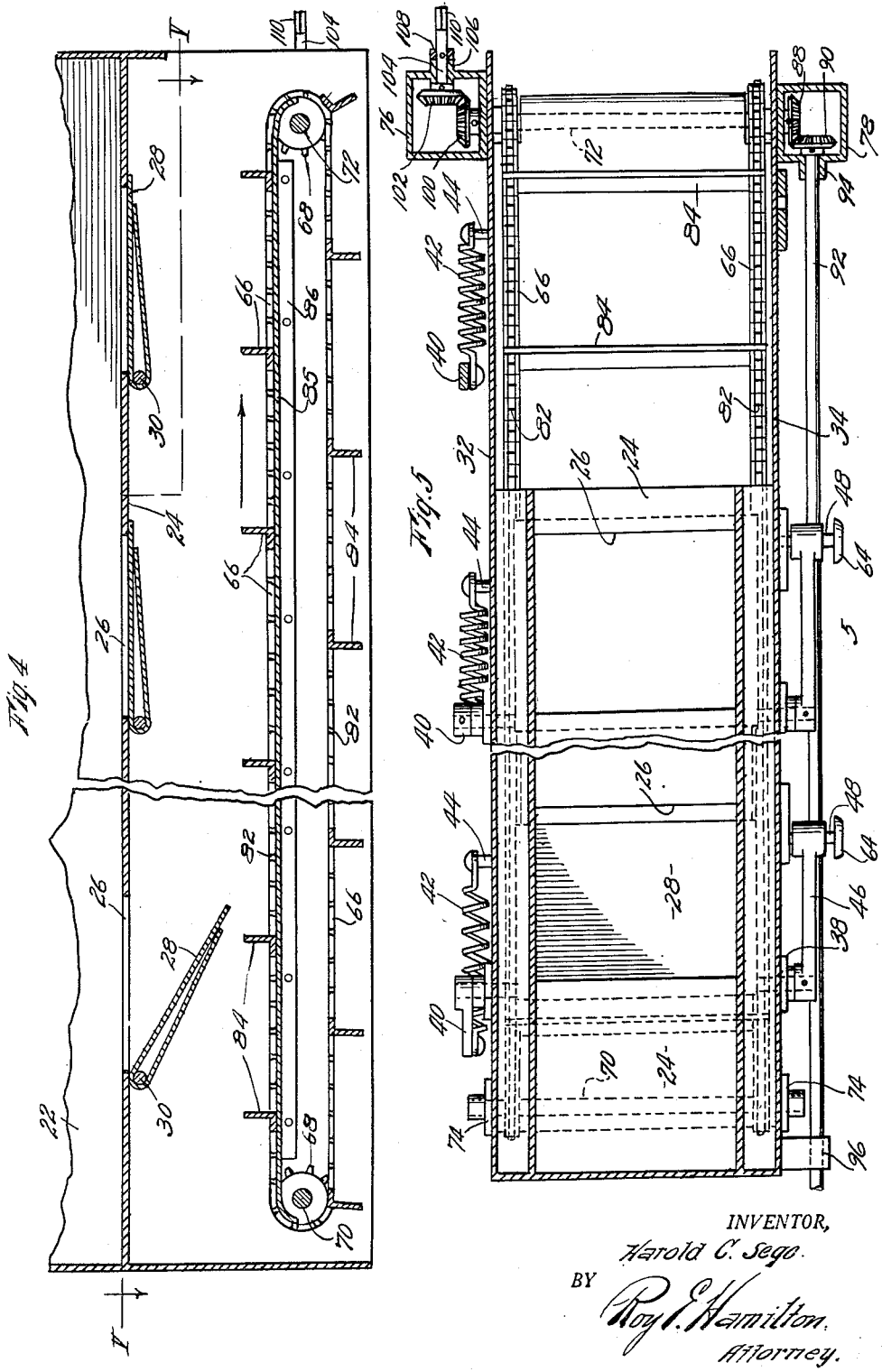
INVENTOR,
Harold C. Sego.
BY
Roy E. Hamilton
Attorney.

Patented Dec. 1, 1953

2,661,104

UNITED STATES PATENT OFFICE 2,661,104

GRAIN BED FOR VEHICLES

Harold C. Sego, Kansas City, Mo.

Application May 17, 1948, Serial No. 27,529

1 Claim. (Cl. 214—83.2)

This invention relates to improvements in a vehicle bed and has particular reference to a wagon box having a discharge conveyor adapted to be operated by means of a tractor power take-off to unload said box.

The principal object of the present invention is the provision of a wagon box provided with an apertured bottom having swinging closures adapted to normally close said apertures, and having manually operable means whereby said closures may be selectively operated to control the rate of unloading of said vehicle bed.

Another object of this invention is the provision of a vehicle bed having a series of valve controlled outlets, manually operable to deliver material from the various portions of said bed in any desired sequence or rate of flow.

A further object of the invention is the provision of a vehicle box having a series of closures adapted to control the flow of material from said box in the direction of movement of a power driven discharge conveyor carried therebelow.

Other objects are simplicity and economy of construction, ease and efficiency of operation, and adaptability to handle various types and sizes of materials.

With these objects in view, as well as other objects which will appear during the course of the specification, reference will be had to the drawings, wherein:

Figure 1 is an elevational view of the right side elevation of the wagon box mounted on a running gear having parts broken away, and with certain of the parts shown in dotted lines.

Fig. 2 is an elevational view of the left side of the wagon box, with parts broken away and with some parts shown in dotted lines.

Fig. 4 is an enlarged, foreshortened longitudinal view taken on line IV—IV of Fig. 3.

Fig. 5 is an irregular sectional view taken on line V—V of Fig. 4.

Figure 3:
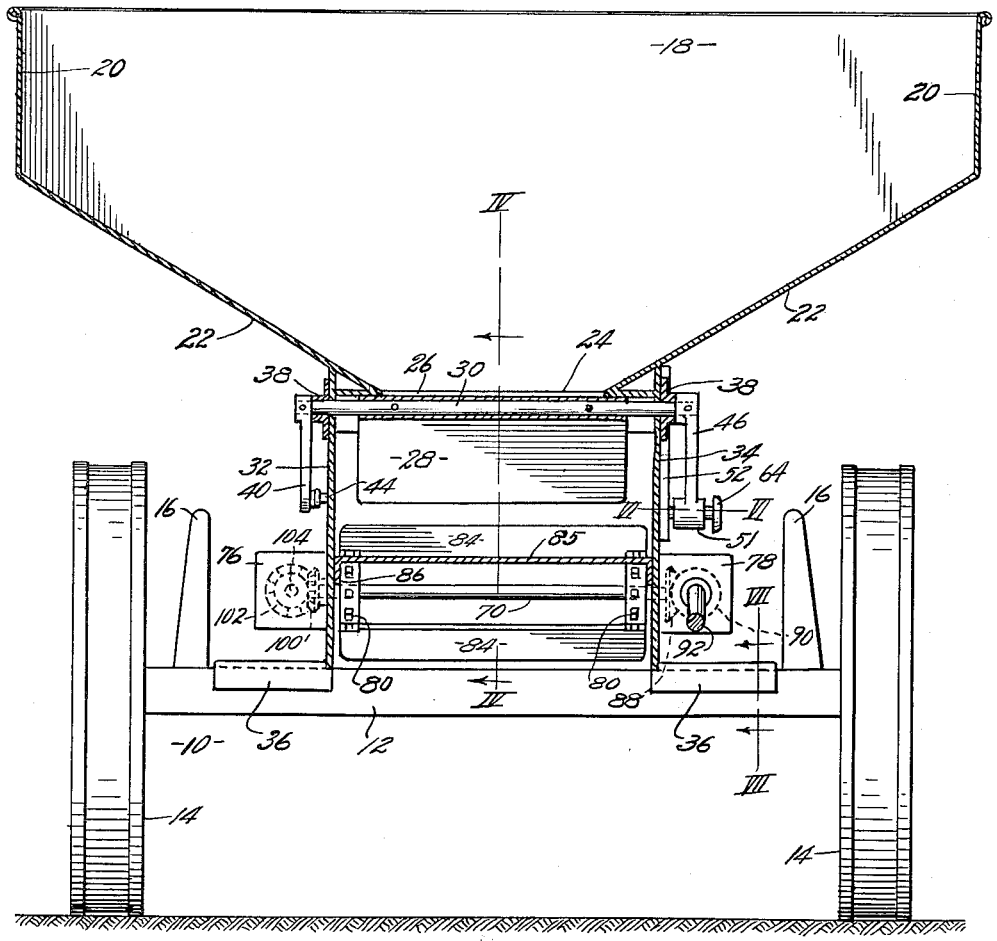
Fig. 3 is an enlarged cross sectional view taken on line III—III of Fig. 2.
Figure 7:
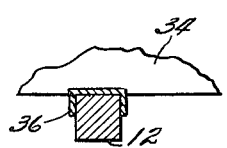
Fig. 7 is a sectional view taken on line VII—VII of Fig. 3.

Throughout the several views like reference characters refer to similar parts and the numeral 10 designates a wagon running gear having bolsters 12 mounted on wheels 14 and having upright standards 16. Wagon box 18 is not of conventional type, but comprises vertical side walls 20, downwardly and inwardly converging walls 22, and a bottom 24 which is provided with longitudinally spaced apart apertures or openings 26. Each opening 26 is provided with a downwardly hinged closure 28 mounted on a shaft 30.

Extending vertically below bottom 24 is a pair of spaced apart side walls 32 and 34 each having at its respective lower edge a pair of outwardly projecting bearing channel members 36 adapted to be fitted over the adjacent bolsters for supporting the box in proper longitudinal relation to the running gear. Furthermore the bearing members 36 are fitted on the bolsters 12 between the standards 16 to present lateral movement of the box on the bolsters.

The shaft 30 projects beyond the ends of the closure 28 to extend through walls 32 and 34. Each wall is provided with a bearing plate 38 to receive the end portions of the shafts 30 as clearly shown in the side elevations of the box and in Fig. 5.

That portion of shaft 30 extending through wall 32 is provided with a fixed lever 40 to which one end of a helical spring 42 is attached while the opposite end of said spring is secured to pin 44 securely mounted in side wall 32. This spring is so positioned as to normally urge the closure 28 snugly against the lower surface of bottom plate 24 to effectually close the opening 26 formed therethrough. The other end of shaft 30 passing through wall 34 is provided with a fixed lever 46 having a spring actuated plunger pin 48 adapted to engage in recesses 50 formed in plate 52 secured to the outer surface of wall 34. The series of recesses 50 are disposed in an arcuate path concentric with the axis of shaft 30 and are so spaced that the upper recess 50 is adapted to receive pin 48 to secure the closure 28 in the closed position and the recesses therebelow allow for different degrees of opening of the closures to regulate the flow of grain through openings 26.

Figure 6:
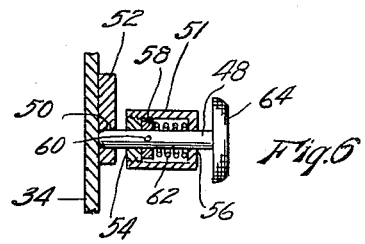
Fig. 6 is an enlarged sectional view taken on line VI—VI of Fig. 3.

Referring to Fig. 6 which shows an enlarged sectional view of the plunger engaging means for positioning the closure 28, it will be noted that lever 46 is provided with a hollow cylindrical head 51 open at its inner end to receive a threaded bearing disc 54 adapted to close the end of the head 51 and to serve as a bearing for pin 48 which also extends through a bearing 56 formed in the outer end of head 51. Mounted on plunger pin 48 within head 51 is a collar 58 fixed to pin 48 by means of a pin 60. Positioned about pin 48 between collar 58 and bearing 56 is a compression spring 62 which serves to urge the pin 48 into recesses 50. To remove the pin 48 from the recess 50 the operator simply pulls the plunger pin cap 64 outwardly, moves the lever to the desired position, releases the cap 64 and permits the pin to engage in the desired recess 50.

An endless belt conveyor 66 is carried on sprocket wheel 68 carried on shafts 70 and 72 rotatably mounted respectively in bearings disposed adjacent the front and rear of said wagon box.

Shaft 70 is mounted in bearings 74 rigidly secured to the outer surfaces of walls 32 and 34, while shaft 72 is mounted in gear box housings 76 and 78 disposed respectively on walls 32 and 34 adjacent the rear end of the wagon box. Each of the shafts 70 and 72 are provided with two spaced apart sprocket wheels 68 disposed between wall members 32 and 34 to operatively receive endless chains 82 joined together by cross bars or flights 84 preferably made of angle iron. The upper reach of conveyor 66 rests on top of a planar sheet metal table 85 flanged along its longitudinal edges at 86 and secured to side walls 32 and 34. This table is normally disposed in a horizontal plane and serves to receive the grain, along which the grain is moved by conveyor 66 to discharge at the rear end of the wagon box. It will be noted that shaft 72 extends into gear housing 78 and is provided with a fixed bevel gear 88 which intermeshes with a bevel gear 90 fixed to the end of drive shaft 92 mounted in bearing 94 in housing 78 and in bearing 96 fixed to the front end box 18. The front end of shaft 92 is squared at 98 to be engaged and rotated by suitable connections to the power take-off of a tractor (not shown). The other end of shaft 72 is provided with a bevel gear 100 which is disposed in gear housing 76 and intermeshes with a bevel gear 102 fixed to a stub shaft 104 rotatable in a bearing 106 integral with the housing 76. A collar 108 positioned on shaft 104 outside housing 76 serves to hold the gears in proper mesh. The end of shaft 104 extends outwardly beyond collar 108 and is squared at 110, to receive the socket of an attachment for driving a conveyor for conveying the grain being delivered from said wagon box (not shown). It is evident that a single attachment to the tractor power take-off will drive all the moving parts of the device.

The manually controlled valves 28 may be selectively opened to unload the box 18 at any desired sequence.

I claim:

A wheeled vehicle including an elongated box having inclined side walls and having a bottom provided with a series of spaced-apart holes formed therethrough, a series of spaced-apart closures hinged at their front edges to the lower side of said bottom and adapted for manual operation whereby they are selectively operable to control the flow of material from any predetermined transverse portion of said box, a discharge conveyor having an endless belt traveling over a stationary plate and carried by said vehicle in spaced relation below said box bottom operable to receive material from said box and to deliver it to the rear of said vehicle, and resiliently operable means to constantly urge said closures toward the closed position.

HAROLD C. SEGO.

References Cited in the file of this patent

UNITED STATES PATENTS

| Number | Name | Date |
| --- | --- | --- |
| 1,603,558 | Schneider et al. | Oct. 19, 1926 |
| 1,762,240 | Pickard | June 10, 1930 |
| 1,921,959 | Warren | Aug. 8, 1933 |
| 2,052,169 | Darden | Aug. 25, 1936 |
| 2,107,682 | Wall | Feb. 8, 1938 |
| 2,180,253 | Moore | Nov. 14, 1939 |
| 2,268,290 | Landis | Dec. 30, 1941 |
| 2,275,799 | Oklejas | Mar. 10, 1942 |
| 2,293,486 | Barrett | Aug. 18, 1942 |
| 2,293,977 | Hoffstetter | Aug. 25, 1942 |
| 2,412,121 | Bradshaw | Dec. 3, 1946 |
| 2,481,860 | Miller | Sept. 13, 1949 |
| 2,484,512 | Ingram | Oct. 11, 1949 |
| 2,520,291 | Wall | Aug. 29, 1950 |
| 2,589,988 | Bruno | Mar. 18, 1952 |